United States Patent [19]
Reid

[11] 3,907,442
[45] Sept. 23, 1975

[54] FASTENER SEALANT INJECTION SYSTEM

[75] Inventor: Bruce D. Reid, Thousand Oaks, Calif.

[73] Assignee: Briles Manufacturing, Omark Industries, Precision Fastening Subsidiary, El Segundo, Calif.

[22] Filed: Nov. 1, 1972

[21] Appl. No.: 302,735

[52] U.S. Cl. ............... 403/37; 277/72 FM; 403/266; 403/268; 403/408; 220/81 R; 85/1 JP
[51] Int. Cl. ............................................. F16b 5/00
[58] Field of Search ............ 85/1 JP; 287/189.36 F, 287/189.36 D, 189.36 J; 425/109; 285/294, 297; 308/120; 277/17, 18, 19, 20, 21, 72 FM; 61/45 R, 45 B; 220/81 R; 151/14.5; 285/21, 22; 403/37, 266, 268

[56] References Cited
UNITED STATES PATENTS

| | | | |
|---|---|---|---|
| 837,767 | 12/1906 | Aims | 61/45 R |
| 935,376 | 9/1909 | Lennon | 285/297 |
| 1,159,779 | 11/1915 | Landau et al. | 85/1 R |
| 1,791,810 | 2/1931 | Furman | 285/284 |
| 1,926,834 | 9/1933 | Campbell | 10/27 R |
| 2,550,357 | 4/1951 | Jansen et al. | 85/9 R |
| 3,052,473 | 9/1962 | Bredtschneider | 277/72 FM |
| 3,396,543 | 8/1968 | White | 61/45 R |
| 3,630,549 | 12/1971 | Grimm | 285/297 |

Primary Examiner—James R. Boler
Assistant Examiner—Conrad L. Berman
Attorney, Agent, or Firm—Albert L. Gabriel

[57] ABSTRACT

A system for sealing "wet wing" areas of aircraft wherein access for injecting the sealant is obtained without requiring removal and replacement of entire fasteners. A novel injection bolt employed in a row of fasteners which secure wet wing structural members together provides access to a sealant channel along the interface between the structural members for injection of sealant into the channel without requiring removal of any of the fasteners or otherwise disturbing the structural integrity of the wing. The injection bolt has a tapped bore extending axially therein from its head past the region of the sealant channel, and radially directed injection port means in the shank of the bolt provides communication between the bore and the sealant channel. An injection probe is threadedly engaged in the bore of the bolt, and sealant is injected through the injection port means into the channel to seal the joint between the structural members. Upon removal of the injection probe, a plug screw is threadedly engaged in the bore of the bolt to prevent any sealant from coming out.

3 Claims, 8 Drawing Figures

FASTENER SEALANT INJECTION SYSTEM

BACKGROUND OF THE INVENTION

It is current practice in many high performance aircraft to define wing fuel tanks between structural portions of the wings, this type of wing fuel tank being commonly referred to as a wet wing area. Such wet wing areas avoid the necessity for separate wing tank structures. In large aircraft, such wet wing areas are located in the wing box, in the inner wing, and also in the outer wing. In small aircraft, such wet wing areas are located in the wing box and fairing region which is commonly referred to as the inner wing, and also in the outer wing.

An example of a typical wet wing fuel tank would include substantially the entire length of an outer wing section, which may extend anywhere from about ten to about thirty feet, and primary structural components of such a wet wing tank include the bottom wing skin and wing spars. Generally all of the hydraulic lines, cables, and the like are disposed above the wet wing part, and then the top of the wing is principally a fairing. Accordingly, the wet wing area is proximate the undersurface of the wing, which is its highest stress region and therefore a region which is critical insofar as maintaining structural integrity is concerned.

In addition to the highly stressed and critical structural connection between such wing members as wing spars and bottom wing skins, when these members are employed as portions of wet wing fuel tanks, it is essential that a good seal against fuel leakage be provided in the lengthy joint or interface between these elongated structural members. The metal-to-metal connection between the members, no matter how tightly compressed by the fastening system, cannot provide the required positive seal against the leakage of fuel through the joint, particularly since such a structural joint is proximate the bottom of the wing with most of the flight regime of the aircraft right side up, and with fuel tank pressurization which is standard at 8½ p.s.i.g., and is applied as high as 11 p.s.i.g. While self-sealing elastomeric bladders are provided in such wet wing areas of some military aircraft, these are not intended to, and do not, provide a 100 percent seal, and without a positive seal along the length of the joint or interface between the structural members of the wet wing area, there still would be creeping and wicking of fuel between the members if there were not a positive seal applied directly in the interface between the members.

For the foregoing reasons, it has become almost standard in high performance wet wing aircraft to provide a longitudinal sealing channel along the interface between adjoining structural members in a wet wing area, as for example between bottom skin and spar members, and to inject a flowable sealant under pressure into this channel. The sealant that is used is of a noncurable type, such as a two-part polysulfide-type sealant. Typical sealants that are used are covered by current U.S. Mil S 8802. Then for assurance that the seal does not deteriorate, fresh sealant of this type is re-injected into the channel, pushing out the old sealant, approximately every 100 flying hours of the aircraft.

In the typical installation the adjoining wet wing structural members will be secured together by a row of regularly spaced fasteners which extend the entire length of the members, and the aforesaid channel will be in line with the row of fasteners, the channel being somewhat wider than the fasteners and bridging the fasteners so as to seal not only the interface between the structural members, but also the interfaces between the fasteners and the bores through which they extend. Current practice for obtaining access to such sealant channel for reinjection of new sealant and pushing out the old sealant is to have spaced fasteners along the row that are removable to provide access bores through which the fresh sealant can be pumped. Conventional locknuts cannot be used with these removable fasteners, but nut plates are required on the inside of the structural members.

This requirement that many of the fasteners be completely removed (usually every 5th or 6th fastener in the row) for injection of fresh sealant every 100 hours of flight time, and then be replaced after the sealant has been injected, is an objectionable practice for a number of reasons. Primarily, this requires the disrupting of the carefully applied structural integrity of the fastened wing structure each time the fasteners are removed and replaced. Whenever such fasteners are removed, there is a certain amount of stress relieving, and when they are then replaced, there is no assurance that the wing structure is returned to its identical strength and fatigue capabilities. Another problem with such removal and replacement of fasteners is that it requires other than optimum type fasteners, in that conventional nuts cannot be used with such fasteners, and head structures must be provided enabling the fasteners to be removed from the outside of the wing, where fastener heads must be generally flush with the skin.

Another problem with such removal and replacement of fasteners for sealant injection access is that the removed fasteners will not all have the same injected-pressurized seal applied to them as do the unremoved fasteners. Also, the fastener holes of the removed fasteners tend to have an excess of sealant in their proximity, which makes clamp-up of these fasteners somewhat uncertain when they are replaced.

SUMMARY OF THE INVENTION

In view of these and other problems in the art, it is an object of the present invention to provide a novel system for sealing wet wing areas of aircraft wherein access for periodic injection of the sealant is obtained without requiring the removal and replacement of any of the fasteners securing together adjacent structural members of the wet wing area. In this manner structural integrity of the wing remains completely unaffected by the procedure of supply or resupplying fresh sealant into the joint or interface between the structural members and pushing out the old sealant therefrom.

Another object of the invention is to provide a novel wet wing sealant injection system of the character described which, by eliminating the necessity for removal and replacement of fasteners during the sealant injection operation, permits fasteners to be employed which are of optimum strength and fatique characteristics, which may all include conventional locknuts.

According to the invention, a novel injection bolt is provided in place of a conventional bolt at spaced intervals in a row of fasteners which secures adjacent wet wing structural members together. Usually, an injection bolt of this type will constitute every 5th or 6th fastener in the row. The injection bolt of the invention has a tapped bore therein which extends axially from an open end in the head of the bolt into the shank past the region of the sealant channel in the joint. In most injection bolts according to the invention, there is a pair of injection ports which are diametrically opposed and extend radially outwardly from the tapped bore in the bolt to the outer surface of the shank of the bolt in the region of the sealant channel. An injection probe is removably threadedly engaged in the tapped bore of the bolt, and sealant is injected through the injection ports into the channel so as to force fresh sealant into the channel and push old sealant out of the channel. Orientation marks are provided on the head of the bolt so that when the bolt is permanently fastened into position, the orientation marks will indicate the directions of the injection ports, which is preferably aligned with the sealant channel for most efficient injection of the sealant into the channel. At some points in the channel it may be desirable to inject sealant in only one direction as for example at the end one of a row of fasteners, and for this situation, some fasteners according to the invention will be provided with only a single injection port rather than the pair of diametrically opposed ports; and this single injection port will be indicated by a corresponding single orientation mark on the head of the bolt.

Preferably, the injection ports are oblong in the axial direction of the bolts so as to be substantially longer than the depth of the sealant channel to accommodate tolerance variations and thereby assure that the injection ports will register with the sealant channel. The rounded ends of the oblong ports eliminate any tendency for stress cracking to occur.

When the injection has been completed as to any bolt, upon removal of the injection probe a plug screw is threadedly engaged in the bore of the bolt to prevent any of the sealant from coming back out.

It has been found in experimental installations of the present invention that the structural changes in a conventional bolt that are required to embody the present invention, namely, the tapped central bore and the small injection ports, do not substantially diminish the structural integrity of the bolt. Thus, conventional bolts which are modified according to the present invention have substantially the same capability of supporting static structural loads as the corresponding unmodified bolts, having substantially the same tensile and shear capabilities, as well as fatigue strength.

The present invention is equally adaptable for use in connection with straight shank bolts, taper shank bolts, stepped shank bolts, or other bolt configurations. Since an injection bolt according to the invention need not be removed from the structural members for re-injection of sealant, tapered interference fasteners may be employed with the invention of the type wherein an oversized tapered shank is drawn into interference fit with a tapered bore through the structural members. With such tapered interference fasteners, the bolt may be of the type that is drawn into the bore from the nut side with a head that does not require gripping means thereon because the interference prevents rotation of the shank. Tapered interference fasteners of this type which are suitable for use with the present invention are disclosed in U.S. Pat. No. 3,034,611, issued May 15, 1962 to John Zenzic, for "Tapered Locking Device".

Further objects and advantages of the present invention will appear during the course of the following part of the specification, wherein the details of construction, mode of operation, and novel method steps of presently preferred embodiments are described with reference to the accompanying drawings, in which:

DETAILED DESCRIPTION

Figure 1:
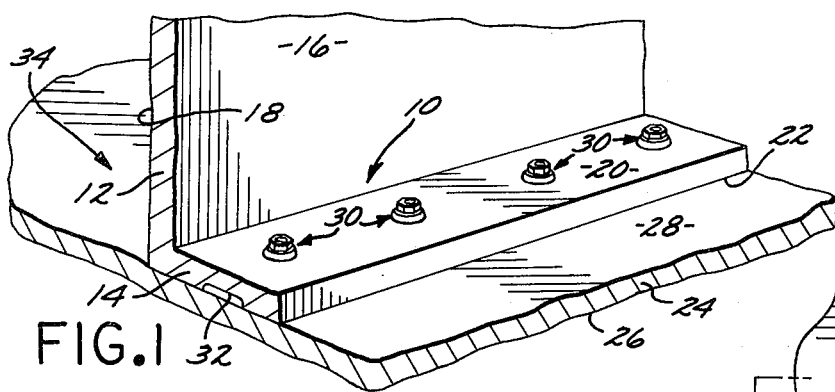
FIG. 1 is a fragmentary perspective view illustrating a joint between a wing spar and bottom wing skin that is sealed in accordance with the present invention.

Referring to the drawings, FIG. 1 illustrates typical aircraft wet wing environment, including a wing spar generally designated 10, which is an angle member including a generally vertical or upright web portion 12 and a generally horizontal base portion 14. Only a small segment of the length of the spar 10 is illustrated, but it is to be understood that this is an elongated member that typically will extend anywhere from about 10 feet to about 30 feet in length. The web portion 12 of spar 10 has outer and inner surfaces 16 and 18, respectively; while the base portion 14 of spar 10 has respective outer and inner surfaces 20 and 22. The inner surface 22 of base portion 14 is substantially flat, and is adapted to be engaged flush against bottom wing skin 24. The skin 24 has outer, lower surface 26, and inner, upper surface 28, the inner surface 22 of the base portion of the spar mating flush against the inner surface 28 of the skin.

Figures 3, 4:
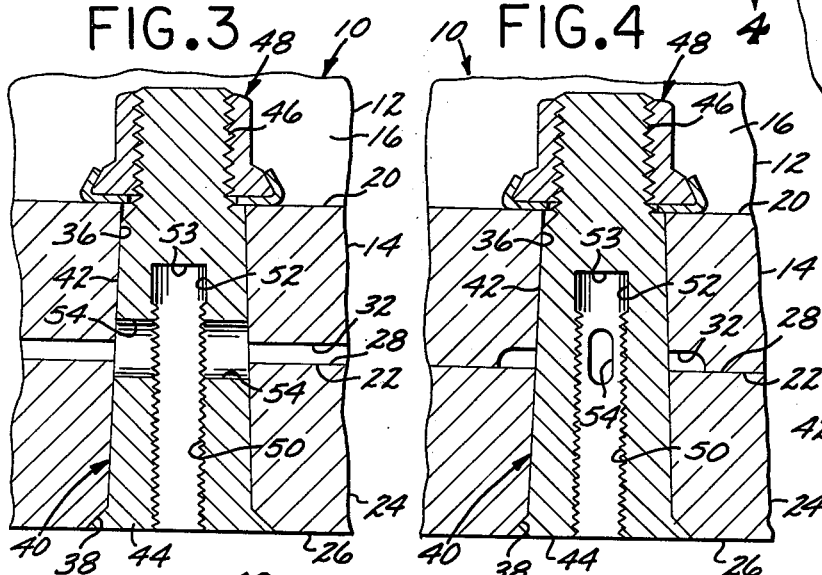
FIG. 3 is a vertical section taken on the line 3—3 in FIG. 2, the section being taken axially of the sealant channel and bolt injection ports, and also axially of the bolt.
FIG. 4 is a vertical section taken on the line 4-4 in FIG. 2, taken transversely of the sealant injection channel and of the injection ports, but axially of the bolt.
Figure 7:
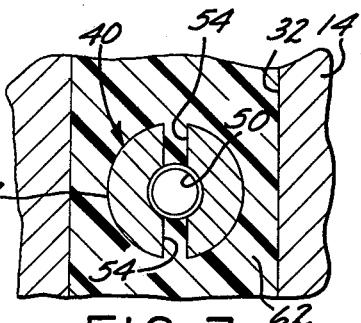
FIG. 7 is a horizontal section taken on the line 7—7 in FIG. 6 showing the channel and injection ports filled with sealant.
Figures 5, 6, 8:
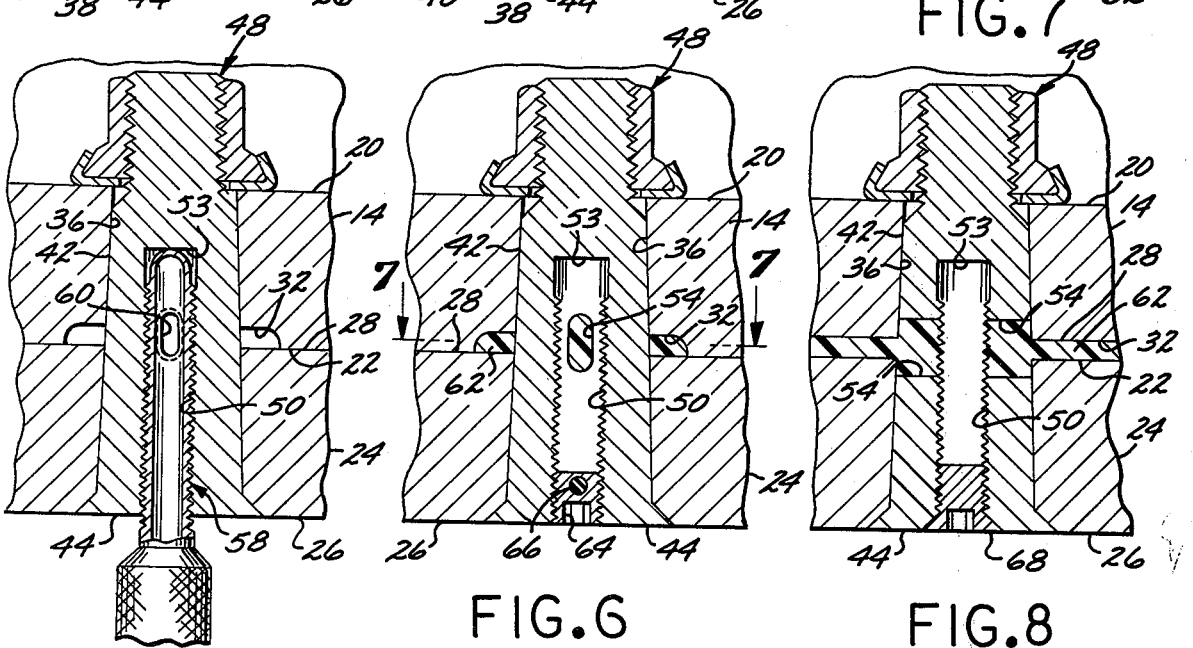
FIG. 5 is a vertical section similar to FIG. 4, with the sealant injection probe operatively engaged in the bolt.
FIG. 6 is a vertical section similar to FIGS. 4 and 5, after the sealant has been injected, and the probe removed and replaced with a plug screw.
FIG. 8 is a vertical section similar to FIG. 3, after the sealant has been injected, and with a second form of plug screw engaged in the bolt.

The skin 24 extends longitudinally with the spar 10, and the two are secured together by means of an aligned, regularly spaced series of fasteners 30 extending longitudinally along the length of the spar 10. A sealant channel 32 is defined between a groove or trough in the bottom or inner surface 22 of the base portion 14 of the spar on the one hand and the upwardly facing inner surface 28 of the skin on the other hand. The sealant channel 32 extends longitudinally along the length of the spar 10 and skin 24, substantially coextensive with the row of fasteners 30, and generally laterally registering with the fasteners 30 so as to bridge the fasteners as best seen in FIGS. 4, 5, and 6, the channel 32 being substantially wider than the fasteners.

With the spar and skin arrangement as illustrated in FIG. 1, the wet wing fuel tank is in the region defined above the inner surface 28 of skin 24 and behind the inner surface 18 of the web portion 12 of spar 10; the wet wing fuel tank region being generally designated 34.

The embodiment of the injection bolt of the present invention that is illustrated in the drawing is of the tapered interference type disclosed in the aforesaid Zenzic U.S. Pat. No. 3,034,611, which is currently widely used in high performance wet wing aircraft structures. It is to be understood, however, as stated above that the invention is equally adaptable to other bolt configurations.

A bolt according to the invention is installed in a tapered bore 36 extending through the skin 24 and base portion 14 of the spar, the bore 36 being generally laterally centered relative to the sealant channel 32 as best illustrated in FIGS. 4 to 7. An injection bolt 40 according to the invention is engaged through the bore 36, and usually there will be one of these injection bolts 40 of the invention disposed as every 5th or 6th bolt in the row of fasteners 30 of FIG. 1. The bolt 40 has a tapered shank 42 engaged in interference fit with the wall of the bore 36, the bolt 40 having a flush-type head 44 which seats in countersink 38 at the lower end of bore 36. At the other end of the bolt there is a straight threaded region 46 having a locknut threadedly engaged thereon, the locknut 48 bearing against the upper surface of the base portion 14 of the spar to provide clamp-up between the skin 24 and the spar portion 14. The bolt 40 is permanently mounted in this position, and need not be removed for injection of sealant into the channel 32.

The bolt 40 has an axial threaded bore 50 therein which opens at the head end of the bolt, and extends upwardly through the shank 42 of the bolt past the region of the sealant channel 32, the bore 50 terminating in the upper portion of the shank 42 in a thread relief area 52 and bore end surface 53.

Extending radially through the wall of the bolt shank 42 from the threaded bore 50 to the outer surface thereof is a pair of diametrically opposed injection ports or slots 54. These ports 54 are preferably oval in configuration with the long axis of the oval in the direction of the axis of the bolt. Such oval injection port configuration has several important advantages. One advantage is that the ports may be made substantially longer than the depth of the sealant channel 32 so as to assure registry of the ports 54 with the sealant channel 32 despite tolerance variations in the structural members and/or the bolts. Preferably, the ports or slots 54 in the bolt will have length in the axial direction of the bolt that is approximately twice the depth of the sealant channel 32. The width of the ports or slots 54 need not be nearly so great as the length, but need only be sufficient for good flow of the sealant therethrough. It has been found in experimental practice that the width of the ports 54 need only be approximately one-half of the length thereof for satisfactory injection. This narrow width of the ports 54 maintains the structural integrity of the bolt in the cross-sectional direction of the bolt which is the important direction insofar as shear and tensile strengths are concerned. The more extended longitudinal direction of the oblong injection ports 54 does not detract from the structural integrity of the bolt.

A further advantage of the oblong configuration of the injection ports or slots 54 is that the rounded ends thereof are an optimum configuration for minimizing stress concentrations according to the Griffith Microcrack Theory. A presently preferred oblong configuration for the injection ports 54 embodies a length in the axial direction of the bolt that is approximately twice the width in the lateral direction of the bolt. In test installations injection ports or slots 54 have been found to be satisfactory which had a width of approximately .060 inch and a length (axially of the bolt) approximately .120 inch; and wherein the slots were defined by straight longitudinal sides approximately 0.060 inch long terminating in arcuate ends of approximately 0.030 inch radius. Injection ports 54 of such dimensions were employed satisfactorily with a sealant channel 32 having a depth of approximately 0.060 inch. These dimensions are given by way of example only, and not of limitation, and it will be understood that the invention is not limited to these particular dimensions.

It has also been found in experimental practice that a single size of injection ports 54 may be employed in injection bolts 40 of any desired size, no matter how large. All that is required is for the injection ports 54 to be sufficiently large for satisfactory extrusion of the sealant into the channel 32, and any additional size will not be useful for this intended purpose, but will tend to decrease the strength of the bolt.

It has been determined that the maximum width for the injection ports or slots 54 (width of the oblong) is approximately one-third of the nominal diameter of the bolt, which is based upon thread size, in order to not substantially reduce the structural integrity of the bolt. Thus, for the previous example wherein the width of the injection ports or slots 54 was approximately 0.060 inch, the minimum nominal diameter of the bolt would be about three-sixteenths inch. Most injection bolts of this type will have a considerably larger diameter.

A presently preferred size for the threaded bore 50 in the injection bolt is a nominal diameter between about one-eighth inch about five thirty-seconds inch, although other sizes may, of course, be employed within the invention. For a minimum diameter bolt having a nominal diameter of three-sixteenths inch, the threaded bore 50 should not have a diameter larger than one-eighth inch. For an injection bolt having a nominal diameter of one-forth inch, it has been found in experimental practice that the threaded bore 50 should not be larger than about five thirty-seconds inch. Such a five thrity-seconds inch tapped bore has a known size designation of 832-UNC-3B.

Larger size threaded bores 50 may be employed for injection bolts having larger diameters, but are generally neither necessary nor desirable.

In order to provide an injection bolt 40 of maximum structural integrity, it is preferred to machine both the threaded bore 50 and the injection ports 54 out of a properly forged bolt after the bolt has been forged.

Figure 2:
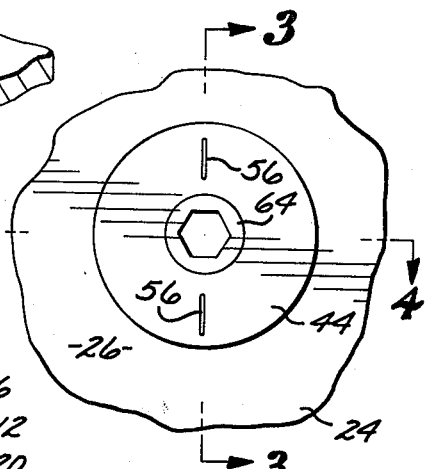
FIG. 2 is a fragmentary bottom plan view illustrating one of the fasteners of the present invention installed in the joint shown in FIG. 1.

It is preferable that the injection ports 54 be aligned with the sealant channel 32 so that the extrusion pressure will be in the axial direction of the channel 32. Such alignment is facilitated by providing a pair of orientation marks 56 in the head 44 of bolt 40, such marks 56 preferably being in the form of radially oriented notches in the head 44 as best seen in FIG. 2. In some installations, an injection bolt may be disposed at a point in the sealant channel at which it is desirable to extrude sealant in only one direction in the channel. For example, it may be desirable to extrude metal chips through the channel in only one direction, utilizing the present system as a purging system as well as a sealing system. In such case, only a single injection port 54 will be employed in the injection bolt, and correspondingly only a single one of the orientation marks 56 will be provided in the head 44 to indicate the direction of such injection port.

FIG. 5 illustrates an injection probe 58 threadedly engaged in the bore 50, the probe 58 having diametrically opposed extrusion ports 60 therein which are aligned with the respective injection ports 54 of the bolt. Such alignment may be by external aligning indicia on the probe 58, or may if desired correspond to bottoming of the tip of the probe against the end surface 53 of the bore 50. The injection probe 58 is tubular, and the sealant is injected therethrough and out the extrusion ports 60 and through the injection ports 54 of the bolt and thence longitudinally through the sealant channel 32 so as to fill the channel 32 and seal not only the interface between the spar and skin, but also the interface between the bolts and bolt holes. While any suitable type of sealant may by employed, typically the aforesaid non-curable two-part polysulfide type sealant will be employed.

The internal threads in the bore 50 enable the injection probe 58 to be secured by threaded engagement against being forced back out of the hole during the injection operation.

Following the injection of the sealant, the injection probe 58 is unscrewed from the threaded bore 50 and is replaced by a plug screw which is threadedly engaged in the outer end portion of the bore 50 as illustrated in FIGS. 6 and 8 to prevent any sealant from coming out. FIG. 6 illustrates one form of Allen screw plug 64 which is seated entirely within the bore 50 and is secured in place by means of a Nylon lock patch 66. FIG. 8 illustrates another form of plug screw 68 which is of the flush head type, the tapered head thereof seating in a counterbore in the bolt head to lock the plug screw in position.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

I claim:

1. A joint structure including a plurality of overlapping members and means defining a continuous sealant channel extending along the interface between respective pairs of members, with at least a pair of holes extending through said plurality of members spaced along said joint and substantially centrally intersecting said channel; at least a pair of bolt-type fasteners comprising a portion of the joint structure, each fastener comprising a head and a gripping end proximate opposite sides of said plurality of overlapping members, and a shank engaged through respective ones of said holes, each of said fasteners having an injection bore opening at one of said ends and extending into the shank to a position proximate said channel, each of said fasteners having a radially extending injection port means in communication with said bore, said port means extending entirely through the wall of said shank and terminating at least in part in said channel, and further wherein the width of said channel is greater than the diameter of each of said fasteners in the area of the ports, said channel further providing communication between said fastener injection ports, and said bore and port means in said fasteners providing a flow path for the injection of flowable sealant into said channel and along the length thereof, whereby the length of said channel may be supplied or resupplied with sealant without disturbing the fasteners after assembly of the joint structure.

2. The joint structure recited in claim 1, further wherein said radially extending injection port in each of said fasteners extends axially along the fastener and increment of length substantially corresponding to twice the height of said channel.

3. A joint structure as recited in claim 2, further wherein each of said holes and each of said shanks are tapered in the same direction and with substantially the same rate of taper, the diameters of the walls of said shanks being greater than the initial corresponding diameters of said holes, whereby said shanks have an interference fit in said holes, the head of each fastener being provided with an orientation mark thereon indicating the orientation of its respective port for assisting in alignment of said port with said channel during the assembly of said joint.

* * * * *